United States Patent [19]

Tyrell et al.

[11] Patent Number: 4,861,862
[45] Date of Patent: Aug. 29, 1989

[54] POLYETHERIMIDE AMIDE FROM POLYOXYALKYLENE DIIMIDE DICARBOXYLIC ACID

[75] Inventors: John A. Tyrell, Dalton, Mass.; Russell J. McCready, Downingtown, Pa.

[73] Assignee: General Electric Company, Mt. Vernon, Ind.

[21] Appl. No.: 139,925

[22] Filed: Dec. 31, 1987

[51] Int. Cl.$^4$ .............................................. C08G 73/10
[52] U.S. Cl. .................................. 528/322; 528/170; 528/208; 528/229; 528/321; 528/331
[58] Field of Search ............... 528/322, 321, 331, 229, 528/208, 170

[56] References Cited

U.S. PATENT DOCUMENTS 3,975,345  8/1976  Fessler .................................. 528/322
4,658,010  4/1987  Long et al. ........................... 528/322

FOREIGN PATENT DOCUMENTS 2425666  12/1975  Fed. Rep. of Germany ...... 528/322

Primary Examiner—Harold D. Anderson
Attorney, Agent, or Firm—William F. Mufatti; Daniel De Joseph

[57] ABSTRACT

Thermoplastic polymeric amides are disclosed which have utility as hot melt adhesive compounds. The compounds are the reaction product of a polyoxyalkylene diimide diacid and a diamine.

11 Claims, No Drawings

POLYETHERIMIDE AMIDE FROM POLYOXYALKYLENE DIIMIDE DICARBOXYLIC ACID

Thermoplastic copolyester adhesives are well known, having been described in numerous patents including for example, U.S. Pat. Nos. 3,832,314; 3,932,326; 4,062,907; 4,130,603 and 4,145,335. These are all based on segmented copolyetheresters having long chain ether-ester units and short chain ester units, alone or blended with a low molecular weight thermoplastic resin. Additional hot melt adhesive compositions have been prepared based on polyester amides, see e.g. U.S. Pat. No. 4,254,254.

A new class of polymers containing polyoxyalkylene diimide diacid segments has been found. These polymers are especially useful as hot melt adhesives.

SUMMARY OF THE INVENTION

The present invention is directed to thermoplastic elastomeric polyetherimide amides comrising the reaction product of one or more diamines and one or more polyoxyalkylene diimide diacids.

These compositions are believed to be capable of a number of commercial applications and are especially suited for use in hot melt adhesives.

DETAILED DESCRIPTION

The novel polymers of the present invention comprise the reaction product of one or more diamines and a diimide diacid. These are generally represented by repeating structural units of the following Formula I:

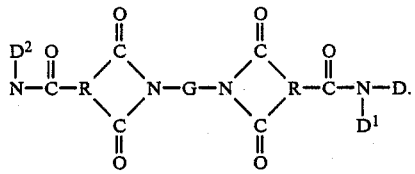

where each R is independently a trivalent organic radical, preferably a $C_2$ to $C_{20}$ aliphatic, aromatic or cycloaliphatic trivalent organic radical; G is the radical remaining after removal of the terminal (or as nearly terminal as possible) amino groups of a long chain alkylene ether diamine having an average molecular weight of from about 600 to about 12000, preferably from about 900 to about 4000; and D is a bivalent organic radical, preferably a $C_2$ to $C_{20}$ aliphatic, aromatic or cycloaliphatic bivalent organic radical; and $D^1$ and $D^2$ are the same or are different and are a monovalent organic radical, preferably a $C_2$ to $C_{20}$ aliphatic, aromatic or cycloaliphatic monovalent organic radical.

As defined above, the term aliphatic includes straight or branched chained moities wherein one or more of the substituents may be an aromatic or cycloaliphatic radical.

The polyoxyalkylene diimide diacids and their equivalents including diesters, suitable for use as starting materials herein are high molecular weight diimide diacids or equivalents having an average molecular weight greater than about 700, preferably greater than about 900. They may be prepared by the imidization reaction of one or more tricarboxylic acid compounds containing two vicinal carboxyl groups or an anhydride group and an additional carboxyl group which must be esterifiable and preferably is nonimidizable with a high molecular weight poly(oxy alkylene)diamine. These polyoxyalkylene diimide diacids and processes for their preparation are disclosed in U.S. Pat. No. 4,556,705, incorporated herein by reference.

The polyoxyalkylene diimide diacid and equivalents may be represented by the general Formula II:

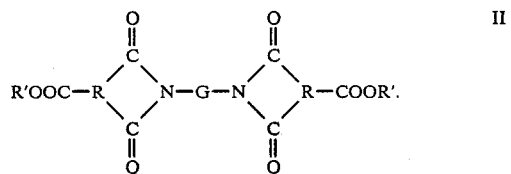

wherein each R is independently a trivalent organic radical, preferably a $C_2$–$C_{20}$ aliphatic or cycloaliphatic, or $C_6$–$C_{20}$ aromatic trivalent racical;

each R' is independently preferably hydrogen or a monovalent organic radical which is preferably selected from $C_{12}$–$C_6$ aliphatic and/or cycloaliphatic radicals and $C_6$–$C_{12}$ aromatic radicals, e.g., phenyl, tolyl or benzyl; R' is most preferably hydrogen; and G is the radical remaining after the removal of the terminal (or as nearly terminal as possible) amino groups of a long chain alkylene ether diamine having an average molecular weight of from about 600 to about 12000, preferably from about 900 to about 4000, and a carbon-to-oxygen ratio of from about 1.8 to about 4.3.

Representative long chain ether glycols from which the polyoxyalkylene diamine is prepared by amination include poly(ethylene ether)glycol; poly(propylene ether)glycol; poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as ethylene oxide, propylene oxide, and methyl tetrahydrofuran. Polyformal glycols prepared by reacting formaldehyde with diols such as 1,4-butanediol and 1,5-pentanediol are also useful. Especially preferred poly(alkylene ether)glycols and poly(tetramethylene ether)glycols, poly(propylene ether)glycols and poly(ethylene ether)glycols end capped with poly(propylene ether)glycol and/or propylene oxide.

In general, the polyoxyalkylene diamines useful in the practice of the present invention have an average molecular weight of from about 600 to about 12,000, preferably from about 900 to about 4,000.

The tricarboxylic component may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable, and preferably is substantially nonimidizable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-diphenyl tricarboxylic anhydride, 3,3',4-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anhydride, 1,2,5- naphthalene tricarboxylic anhydride, 1,2,4-butane tricarboxylic anhydride, 1,3,4-cyclohexane tricarboxylic anhydride, diphenyl isopropylidene, 3,3′4 tricarboxylic anhydride, 3,4 dicarboxyphenyl 3′-carboxylphenyl ether anhydride; etc.

These tricarboxylic acid materials can be characterized by the following general formula:

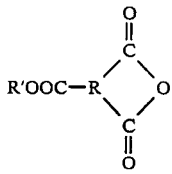

wherein:

R is a trivalent organic radical, preferably a $C_2$–$C_{20}$ aliphatic or cycloaliphatic, or $C_6$–$C_{20}$ aromatic trivalent radical;

R′ is prferably hydrogen or a monovalent organic radical which is preferably selected from $C_1$–$C_6$ aliphatic and/or cycloaliphatic radicals and $C_1$–$C_{12}$ aromatic radicals, e.g., phenyl, tolyl or benzyl; R′ is most preferably hydrogen.

Briefly, these polyoxyalkylene diimide diacids may be prepared by known imidization reactions including melt synthesis or by synthesizing in a solvent system. For example, the diimide diacid may be prepared by reacting 2 moles of the tricarboxylic component per mole of polyoxyalkylene diamine by refluxing at between about 100° C. to 300° C., preferably 150° C. to 250° C., in a suitable solvent such as dimethylformamide, diethylformamide, diethylacetamide, N-methylcaprolactam, or dimethylsulfoxide, among others know to those skilled in the art, or in an azeotropic mixture of said solvent with an additional inert solvent, e.g. xylene. The solvent is subsequently removed by distillation and the residual solvent removed by vacuum drying to leave the diimide diacid. Alternatively the diimide diacid may be prepared by melt synthesis wherein the tricarboxylic component and the diamine are heated at between 100° C. to 300° C., preferably 150° C. to 250° C., while drawing off water, for several hours to produce the diacid. Finally, if the diimide diester is to be used, these may conveniently be prepared by heating about 2 moles of the tricarboxylic component per mole of diamine in an excess of the low molecular weight diol to be used in the polymer ultimately desired. The reaction mixture should contain an esterification catalyst, such as a titanate ester. The reaction is completed by boiling while slowly removing distillate to insure that esterification is completed. Preparation of the diimide diacid or their esters is not meant to be limited to the procedure just described which are illustrative of synthetic methods known in the art.

The diamines which are utilized in the present invention have the formula

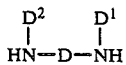

wherein D, $D^1$ and $D^2$ are as defined above.

The preferred diamines for use in the present invention are hexamethylene diamine, ethylene diamine and m-phenylene diamine.

The polymers of the present invention can be prepared readily by melt condensation procedures. Typically, the procedure involves the reaction of the polyoxyalkylene diimide diacids or an ester thereof with a low molecular weight diamine. Initially, the reaction will take place at about atmospheric pressure while the temperature is increased up to about 240°–300° C. while distilling off volatiles.

The typical procedure for the preparation of the polymers of the present invention can be varied widely. For example, as an alternative to the foregoing procedure, it is also possible, depending upon the reactants utilized, to directly charge the reactor system with the polyoxyalkylene diimide diacid reactants rather than preform the diamide diacids.

Both batch and continuous methods can be used for any stage of polymer preparation.

The preparation of the polymers of this invention can be carried out in the presence of an antioxidant, as well as other stabilizers including thermal and UV stabilizers. While stabilizers are not normally required on a laboratory scale, their use, particularly oxidative and/or thermal stabilizers, is preferred on a commercial scale.

Most any stabilizer known in the art for amides may be used including phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 3,5-di-tert-butyl-4-hydroxy hydrocinnamic triester with 1,3,5-tris-(2-hydroxyethyl)-s-triazine-2,4,6-(1H,3H,5H)trione; N,N′-hexamethylene bis-(3,5-bi-tert-butyl-4-hydroxydrocinnamamide 4,4′-bis(2,6-ditertiarybutylphenol); 1,3,5-trimethyl-2,4,6-tris(3,5-ditertiarybutyl-4-hydroxybenzyl) benzene and 4,4′-butylidenebis(6-tertiary-butyl-m-cresol). Various inorganic metal salts or hydroxides can be used as well as organic complexes such as nickel dibutyl dithiocarbonate, manganous salicylate and copper 3-phenyl-salicylate. Typical amine stabilizers include 4,4-bis(a,a-dimethylbenzyl) diphenylamine; N,N′-bis(betanaphthyl)-p-phenylene diamine; N,N-bis(1-methylheptyl)-p-phenylene diamine and either phenylbeta- naphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

DETAILED DESCRIPTION OF THE PREFERRED EMBODIMENTS

The following examples are presented as illustrative of the present invention and are not to be construed as limiting thereof.

Diimide Diacid A

A polyoxyalkylene diimide diacid was prepared by the imidization of trimellitic anhydride with Texaco Chemical Company's Jeffamine ® D2000 polypropylene ether diamine, average molecular weight 2000.

EXAMPLE 1

To a one l reactor equipped with a stirrer and a Dean Stark trap were charged 601 g of Diimide Diacid A, containing 3.5% Irganox 245—a product of Ciba Geigy Corporation for a hindered phenolic stabilizer) and 29.1 grams of 1,6 hexanediamine. The reactor was heated gradually to 210° C. over about 1 hour, with stirring. The temperature was gradually further increased to 245° C., and after a total reaction time of 5 hours, 10 minutes, (9 cc distillate collected), the polymer was removed. After cooling to room temperature there was obtained a very viscous tacky material, with IR consistent with the compound of Formula I.

EXAMPLE 2

The reaction of Example 1 was done, with the exception that 15.0 g ethylene diamine was substituted for the hexanediamine. The resultant polymer was a tacky material, with IR consistent with the compound of Formula I.

Diimide Diacid B

A polyoxyalkylene diimide diacid was prepared by the imidization of trimellitic anhydride with Texaco Chemical Company's Jeffamine ® D230 polypropylene ether diamine, average molecular weight 230.

EXAMPLE 3

To a one 1 reactor, equipped with a Dean Stark trap and stirrer were charged with 446.9 g Diimide Diacid B and 87.2 g 1,6 hexanediamine. The reaction was gradually heated as in Example 1, after 4 hours total reaction time (yielding 24 cc distillate), the polymer, a tacky material, was removed and cooled to room temperature. A transparent, glassy solid was obtained. IR was consistent with the compound of Formula I.

Obviously, other modifications and variations of the present invention are possible in light of the above teachings. It is therefore to be understood that changes may be made in the particular embodiments of the invention described which are within the full intended scope as defined by the appended claims.

What is claimed is:

1. A polyetherimide amide composition reaction product of
   (a) one or more diamines, and (b) one or more polyoxyalkylene diimide dicarboxylic acids.

2. The composition of claim 1 wherein the diamine component (a) is of the formula

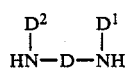

wherein D is a bivalent organic radical; and $D^1$ and $D^2$ are the same or are different and are a monovalent organic radical.

3. The composition of claim 2 wherein the diamines are selected from hexamethylene diamine, ethylene diamine or m-phenylene diamine.

4. The composition of claim 1 wherein the polyoxyalkylene diimide diacid component (b) is derived from one or more polyoxyalkylene diamines and one or more tricarboxylic acid compounds containing two vicinal carboxyl groups or an anhydride group and an additional carboxyl group.

5. The composition of claim 4 wherein said high moleclar weight polyoxyalkylene diimide diacid is represented by the formula

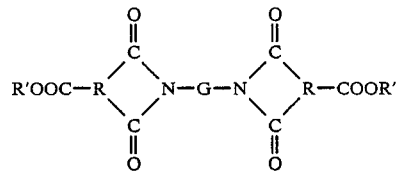

wherein:
  each R is independently selected from $C_2$–$C_{20}$ aliphatic, cycloaliphatic or aromatic trivalent organic radiclas;
  each R' is independently selected from hydrogen, $C_1$–$C_6$ alphatic or cycloaliphatic organic radicals, or $C_6$–$C_{12}$ aromatic monovalent organic radicals; and
  G is the radical remaining after the removal of the amino groups of a long chain alkylene ether diamine.

6. The composition of claim 5 wherein each R is a $C_6$ trivalent aromatic hydrocarbon radical and each R' is hydrogen.

7. The composition of claim 1 wherein the polyoxyalkylene diimide diacid is derived form trimellitic anhydride and a polyoxyalkylene diamine selected from the group consisting of polypropylene oxide diamine and a copoly(ethylene oxide propylene oxide) diamine having predominately polyethylene oxide in the backbone.

8. The composition of claim 1 which further contains a stabilizer.

9. A polyetherimide amide composition reaction prpduct of
   (a) one or more diamines,
   (b) one or more polyoxyalkylene diamine, and
   (c) one or more tricarboxylic acid component containing two vicinal carboxyl groups or an anhydride group and an additional carboxyl group.

10. The composition of claim 9 wherein the polyoxyalkylene diamine is represented by the following formula:

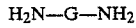

wherein G is the radical remaining after the removal of the terminal amino groups of a long chain alkylene ether diamine.

11. The composition of claim 2 wherein the monovalent organic radical is a $C_2$ to $C_{20}$ aliphatic, aromatic or cycloaliphatic monovalent organic radical.

* * * * *